United States Patent
Yamamoto et al.

(10) Patent No.: US 11,807,401 B2
(45) Date of Patent: Nov. 7, 2023

(54) EMERGENCY DEORBIT DEVICE AND EMERGENCY DEORBIT METHOD

(71) Applicants: IHI Aerospace Co., Ltd., Tokyo (JP); Patchedconics, LLC, Tokyo (JP)

(72) Inventors: Kengo Yamamoto, Tokyo (JP); Junichiro Kawaguchi, Uenohara (JP)

(73) Assignees: IHI AEROSPACE CO., LTD., Tokyo (JP); PATCHEDCONICS, LLC, Tokyo (JP)

( * ) Notice: Subject to any disclaimer, the term of this patent is extended or adjusted under 35 U.S.C. 154(b) by 383 days.

(21) Appl. No.: 17/259,316

(22) PCT Filed: Jul. 27, 2018

(86) PCT No.: PCT/JP2018/028212
§ 371 (c)(1),
(2) Date: Jan. 11, 2021

(87) PCT Pub. No.: WO2020/021696
PCT Pub. Date: Jan. 30, 2020

(65) Prior Publication Data
US 2021/0253278 A1 Aug. 19, 2021

(51) Int. Cl.
*B64G 1/24* (2006.01)
*B64G 1/26* (2006.01)
(Continued)

(52) U.S. Cl.
CPC ............ *B64G 1/242* (2013.01); *B64G 1/26* (2013.01); *B64G 1/403* (2013.01); *B64G 1/44* (2013.01); *B64G 1/62* (2013.01)

(58) Field of Classification Search
CPC .......... B64G 1/242; B64G 1/26; B64G 1/403; B64G 1/44; B64G 1/62
See application file for complete search history.

(56) References Cited

U.S. PATENT DOCUMENTS 9,187,189 B2 * 11/2015 Griffith, Sr. ............ B64G 1/242
9,346,564 B1 5/2016 Rump et al.
(Continued)

FOREIGN PATENT DOCUMENTS

| EP | 3208199 A1 | 8/2017 |
| JP | 2921573 B2 | 4/1999 |

(Continued)

OTHER PUBLICATIONS

Machine Translation of JP-2001335000-A, Kawase S, Dec. 2001 (Year: 2001).*
(Continued)

*Primary Examiner* — Tien Q Dinh
*Assistant Examiner* — Katherine June Bolek
(74) *Attorney, Agent, or Firm* — Volpe Koenig (57) ABSTRACT

An emergency deorbit device provided in a satellite flying on an orbit around the earth includes a propulsion module generating thrust for separating the satellite from the orbit, a reception unit receiving a repeat signal repeatedly sent at an interval from an sending unit of a satellite bus in the satellite, a detection unit outputting a detection signal when the reception unit does not receive the repeat signal in a set time period or when the reception unit receives a deorbit command from the sending unit or from an outside of the satellite, an activation device performing, in response to the detection signal, processing for activating the propulsion module, and a power supply device provided separately from a power supply device of the satellite bus and supplying electric power to the reception unit, the detection unit, and the activation device.

11 Claims, 7 Drawing Sheets

(51) Int. Cl.
  *B64G 1/40* (2006.01)
  *B64G 1/44* (2006.01)
  *B64G 1/62* (2006.01)

(56) References Cited

U.S. PATENT DOCUMENTS

| | | | |
|---|---|---|---|
| 2014/0042275 A1* | 2/2014 | Abrams | B64G 1/407 244/172.6 |
| 2014/0158830 A1* | 6/2014 | Rossettini | B64G 1/242 244/158.6 |
| 2015/0144738 A1* | 5/2015 | Soulier | B64G 1/26 244/158.6 |
| 2015/0353209 A1* | 12/2015 | Turner | B64G 1/405 244/158.6 |
| 2017/0026108 A1* | 1/2017 | Haziza | H04L 7/043 |
| 2017/0160120 A1 | 6/2017 | Core et al. | |

FOREIGN PATENT DOCUMENTS

| | | | |
|---|---|---|---|
| JP | 2001-335000 A | | 12/2001 |
| JP | 2001335000 A | * | 12/2001 |
| JP | 2011-255859 A | | 12/2011 |
| JP | 2014-520724 A | | 8/2014 |
| JP | 6349254 B2 | | 6/2018 |
| WO | 2017/021191 A1 | | 2/2017 |

OTHER PUBLICATIONS

Communication pursuant to Article 94(3) EPC dated Jan. 24, 2023 for European Patent Application No. 18928046.4.
Schonenborg, et al., "Solid Propellant Autonomous DE-Orbit System", 6th International Systems & Concurrent Engineering for Space Applications Conference at the Institute of Space Systems, on Oct. 8-10, 2014 (secesa 2014, Stuttgart, Germany), European Space Agency, Oct. 10, 2014, pp. 1-23 [online], [retrieved on Oct. 15, 2018], retrieved from the Internet: < URL:http://old.esaconferencebureau.com/docs/default-source/14c08_docs/solid-propellant-autonomous-de-orbit-system.pdf>, pp. 6, 8, 9, 11, 15.
International Search Report, PCT/JP2018/028212, dated Oct. 23, 2018, 2 pgs.
Japanese Office Action dated May 20, 2022 for Japanese Patent Application No. 2020-532103.
International Preliminary Report on Patentability dated Feb. 2, 2021 for PCT International Application No. PCT/JP2018/028212.
Extended European Search Report dated Jun. 30, 2021 for European Patent Application No. 18928046.4.

* cited by examiner

EMERGENCY DEORBIT DEVICE AND EMERGENCY DEORBIT METHOD

TECHNICAL FIELD

The present invention relates to a technique of deorbiting a satellite, regardless of soundness of a satellite bus of the satellite.

BACKGROUND ART

Conventionally, a rocket on which a satellite is mounted is launched from the ground, and the satellite is separated from the rocket, causing the satellite to be placed in a desired orbit.

The satellite includes a mission module and a satellite bus. The mission module is a device for fulfilling a purpose (e.g., observation) of the satellite. The satellite bus is a device that supplies electric power to the mission module, controls an attitude and an orbit of the satellite, and performs communication with a ground side.

The satellite is provided with thrusters for controlling an attitude and an orbit of the satellite (e.g., PTL 1). The thrusters are controlled by a control device of the satellite bus. In other words, the thrusters are activated by the control device of the satellite bus such that an observation device as the mission module and a communication antenna of the satellite bus are oriented in desired directions. Further, the thrusters are activated by the control device of the satellite bus such that the satellite is maintained in a predetermined orbit.

Such thrusters are designed so as to generate relatively small thrust and be capable of being activated at the time of necessity over a long period of time (e.g., ten years). In one example, the thrusters use liquid fuel (e.g., hydrazine).

Note that PTL 2 mentioned below describes a safety device for an ignition device related to the present invention.

CITATION LIST

Patent Literatures

PTL 1: Japanese Patent Application Laid-open Publication No. 2011-255859
PTL 2: Japanese Patent No. 2921573
PTL 3 Japanese Patent No. 6349254

SUMMARY OF INVENTION

Technical Problem

It can be presumed that a life of a satellite comes to an end when a satellite bus or a mission module of the satellite malfunctions due to breakdown. A life of a satellite is about 10 years, for example, and is assumed to be 15 years at the longest.

A satellite whose life has come to an end becomes debris continuing to orbit the earth in outer space when no action is taken. As the number of satellites increases, the number of pieces of debris that will occur in the future also increases. For this reason, it is under consideration to establish regulations on debris concerning outer space (e.g., the number of years over which a satellite orbits after an end of a life, or a limit value of the number of pieces of debris).

In this case, in order to meet the debris regulations, it is conceivable to cause a satellite of an ended life to deorbit and re-enter the atmosphere so that the satellite burns up in the atmosphere. Alternatively, it is conceivable to cause a satellite of an ended life to deorbit so as to be placed in a different orbit that does not interfere with other satellites functioning normally.

However, it is difficult to compatibly achieve both a matter of making a satellite function over its entire life and a matter of causing a satellite of an ended life to deorbit and re-enter the atmosphere or to deorbit to be placed in a different orbit, since these matters are contradictory to each other. In other words, it is assumed that when a life of a satellite comes to an end, thrusters and a satellite bus do not function normally, thrusters being provided for controlling an attitude and an orbit of the satellite, the satellite bus being provided for activating the thrusters. In this case, the thrusters cannot be activated, and accordingly, it is impossible to positively cause the satellite to deorbit.

In view of it, an object of the present invention is to provide a technique that can positively deorbit a satellite, regardless of soundness of a satellite bus of the satellite. Note that the present invention accomplishes the above-described object by means different from that of PTL 3.

Solution to Problem

In order to accomplish the above-described object, an emergency deorbit device according to the present invention is an emergency deorbit device provided in a satellite flying on an orbit around the earth, the emergency deorbit device including:

a propulsion module that generates thrust for separating the satellite from the orbit;

a reception unit that receives a repeat signal repeatedly sent at an interval from a sending unit of a satellite bus in the satellite;

a detection unit that outputs a detection signal when the reception unit does not receive the repeat signal in a set time period exceeding the interval, or when the reception unit receives a deorbit command from the sending unit or from a communication device on the ground;

an activation device that performs, in response to the detection signal, processing for activating the propulsion module; and a power supply device that is provided separately from a power supply device of the satellite bus and that supplies electric power to the reception unit, the detection unit, and the activation device.

In order to accomplish the above-described object, an emergency deorbit method according to the present invention is an emergency deorbit method for a satellite flying on an orbit around the earth, wherein a propulsion module for generating thrust for separating the satellite from the orbit is provided in the satellite, the method includes:

a step (A) of receiving, by a reception unit provided in the satellite, a repeat signal repeatedly sent at an interval from a sending unit of a satellite bus in the satellite;

a step (B) of outputting a detection signal when the reception unit does not receive the repeat signal in a set time period exceeding the interval, or when the reception unit receives a deorbit command from the sending unit or from a communication device on the ground; and a step (C) of performing, in response to the detection signal, processing for activating the propulsion module, whereby the propulsion module is activated, wherein the steps (A) to (C) are performed by electric power from a power supply device provided in the satellite separately from a power supply device of the satellite bus.

Advantageous Effects of Invention

According to the present invention, it is possible to positively deorbit a satellite, regardless of soundness of a satellite bus of the satellite.

DESCRIPTION OF EMBODIMENTS

The following describes embodiments of the present invention with reference to the drawings. The same reference sign is allocated to the corresponding part in each of the drawings, and overlapping description is omitted.

First Embodiment

Figure 1:
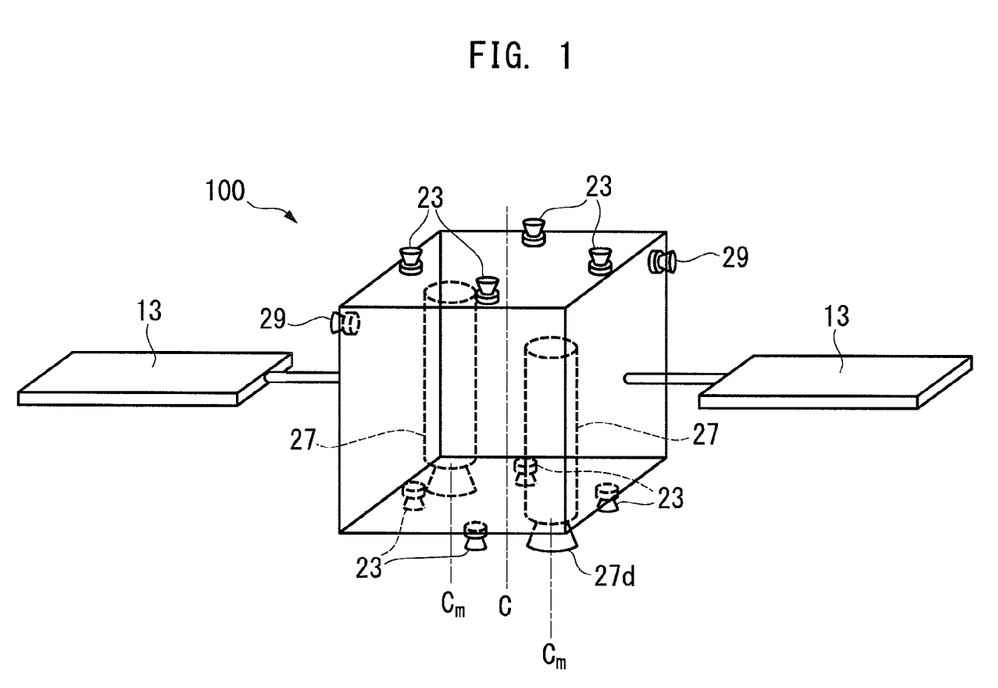
FIG. 1 is a schematic view illustrating a satellite to which an emergency deorbit device according to a first embodiment of the present invention has been applied.
Figure 2:
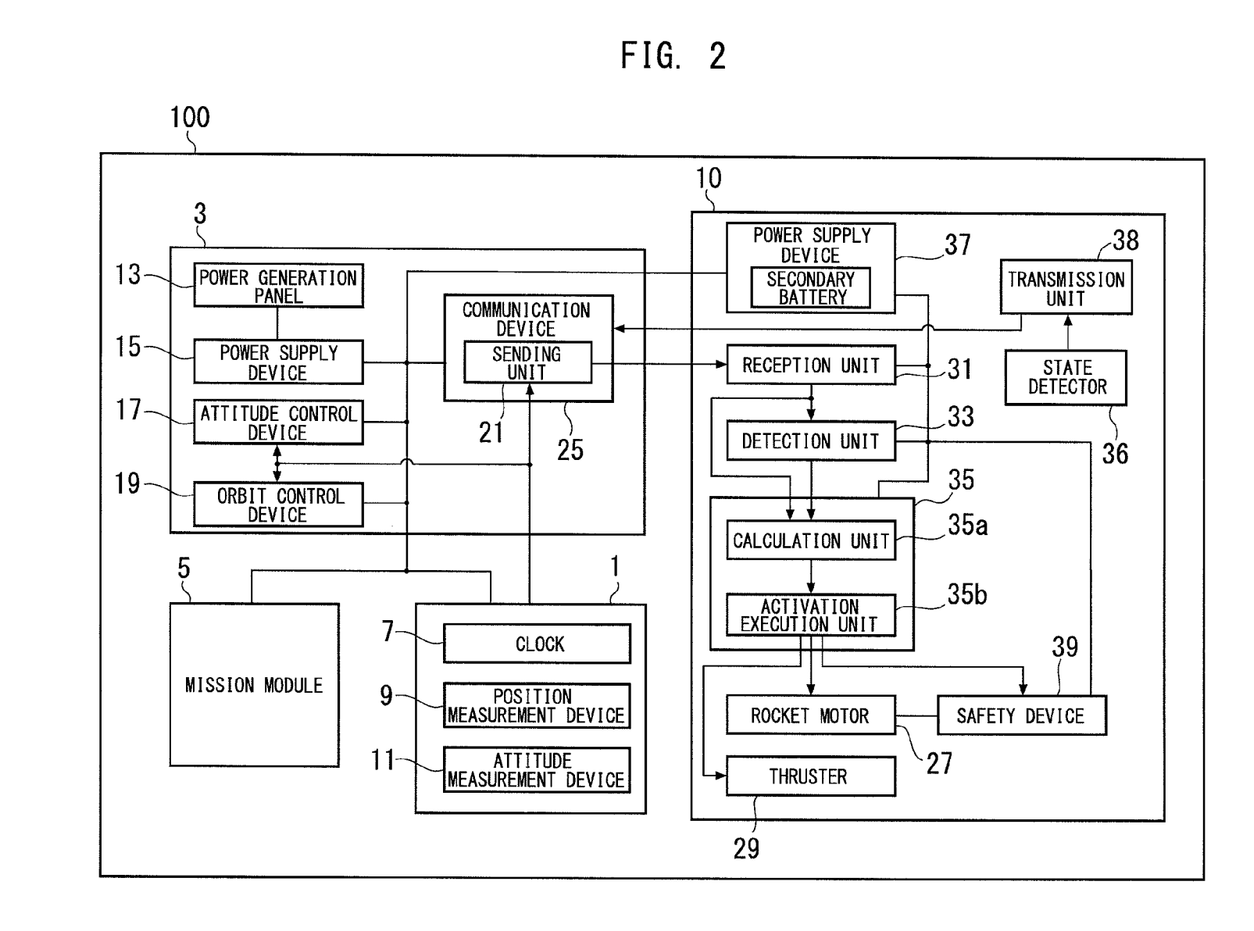
FIG. 2 is a block diagram illustrating a configuration of the satellite to which the emergency deorbit device according to the first embodiment of the present invention has been applied.

FIG. 1 is a schematic view illustrating a satellite 100 to which an emergency deorbit device 10 according to a first embodiment of the present invention has been applied. FIG. 2 is a block diagram illustrating a configuration of the satellite 100 to which the emergency deorbit device 10 according to the first embodiment of the present invention has been applied.

(Basic Constituents of Satellite)

As illustrated in FIG. 2, the satellite 100 includes, as basic constituents, a sensor system 1, a satellite bus 3, and a mission module 5. The sensor system 1, the satellite bus 3, and the mission module 5 are described below as one example, and may be appropriately modified as long as the sensor system 1, the satellite bus 3, and the mission module 5 have configurations to which the emergency deorbit device 10 can be applied.

<Sensor System>

The sensor system 1 includes a clock 7, a position measurement device 9, and an attitude measurement device 11. The clock 7 measures current time. The clock 7 may be an atomic clock (e.g., a cesium atomic clock) that strictly measures current time.

The position measurement device 9 measures a position of the satellite 100. The measured position may be a position represented by a predetermined coordinate system (e.g., a coordinate system fixed to the earth). The position measurement device 9 includes an earth sensor, a sun sensor, and a star sensor, for example, which are not illustrated. The earth sensor, the sun sensor, and the star sensor measure existence directions (directions viewed from the satellite 100) of the earth, the sun, and stars, respectively, the stars spreading around the satellite 100. Based on measurement results of these directions and reference data stored in an un-illustrated reference data storage unit, the position measurement device 9 determines a self-position of the satellite 100. The reference data are a map representing positions of the earth, the sun, and each of the stars.

The attitude measurement device 11 measures an attitude (orientation) of the satellite 100. The measured attitude may be an attitude represented by a predetermined coordinate system (e.g., the coordinate system fixed to the earth). The attitude measurement device 11 measures an attitude of the satellite 100 by using the earth sensor, the sun sensor, the star sensor, a magnetic sensor, or/and the like, for example, which are not illustrated. For example, based on an existence direction of a star measured by the star sensor and the above-described reference data, the attitude measurement device 11 determines an attitude of the satellite 100. Hereinafter, an attitude of the satellite 100 means an attitude of a body of the satellite 100.

<Satellite Bus>

The satellite bus 3 includes a power generation panel 13, a power supply device 15, an attitude control device 17, an orbit control device 19, and a sending unit 21.

The power generation panel 13 generates electric power by receiving sunlight. The power supply device 15 supplies, to each device, the electric power generated by the power generation panel 13. The power supply device 15 may include a secondary battery that stores the electric power generated by the power generation panel 13.

The attitude control device 17 controls an attitude of the satellite 100 by activating an attitude-and-orbit control thruster 23 (refer to FIG. 1), based on an attitude of the satellite 100 measured by the attitude measurement device 11. The orbit control device 19 adjusts an orbit of the satellite 100 by activating the thruster 23, based on a position of the satellite 100 measured by the position measurement device 9, an attitude of the satellite 100 measured by the attitude measurement device 11, and a target orbit. As illustrated in FIG. 1, the satellite 100 may include a plurality of the thrusters 23.

The sending unit 21 repeatedly sends a signal (hereinafter referred to as a repeat signal) to the below-described reception unit 31 at a sending interval in a wireless or wired manner. The sending interval may be constant, or may fluctuate. The sending interval corresponds to an update interval of a sequence of the below-described steps S1 to S3. The sending interval is an interval within a range from approximately one day to one month. The sending interval may be an interval equal to or longer than several hours (e.g., three hours) or one day and equal to or shorter than one month or two months. In one example, the sending interval is one day (twenty four hours), several hours (e.g., three hours), or one month, but is not limited to these. The repeat signal includes time information, position information, and attitude information. The time information indicates time measured by the clock 7. The position information indicates a position of the satellite 100 measured at the measured time by the position measurement device 9, the position being on an orbit, and the attitude information indicates an attitude of the satellite 100 measured at the measured time by the attitude measurement device 11. Here, the orbit may be determined by the position measurement device 9, based on positions of the satellite 100 measured a plurality of times or a large number of times by the position measurement device 9, for example. The thus-determined orbit is included in the position information.

In the present embodiment, the sending unit 21 constitutes a communication device 25 that communicates with a communication device on the ground. In this case, at the above-described sending interval, the sending unit 21 repeatedly sends a repeat signal to the reception unit 31 and the communication device on the ground by wireless communication. However, the sending unit 21 may be provided separately from the communication device 25. In this case, at the above-described sending interval, the sending unit 21 repeatedly sends a repeat signal to the reception unit 31 in a wireless or wired manner.

Further, when the communication device 25 receives, from a communication device on the ground, a command signal making the satellite 100 enter the atmosphere or a command signal making the satellite 100 move to a different orbit, the sending unit 21 transmits a deorbit command to the reception unit 31. Such a command signal may be wirelessly transmitted as an deorbit command directly to the reception unit 31 from a communication device on the ground without passing through the satellite bus 3 (the communication device 25).

<Mission Module>

The mission module 5 is a device for fulfilling the purpose (e.g., observation) of the satellite 100. For example, when the satellite 100 is an environment observation satellite, the mission module 5 includes various sensors and cameras for performing environment observation. When the satellite 100 is a communication satellite, the mission module 5 may be incorporated, as the above-described communication device 25, in the satellite bus 3.

(Configuration of Emergency Deorbit Device)

The emergency deorbit device 10 according to the first embodiment is provided in the satellite 100. By the emergency deorbit device 10, the satellite 100 flying on a predetermined orbit and orbiting the earth is caused to deorbit from the predetermined orbit, and enter the atmosphere or move to a different orbit. Here, the different orbit means an orbit that does not interfere with orbits of other satellites functioning normally. In the first embodiment, when a life of the satellite 100 comes to an end, the emergency deorbit device 10 causes the satellite 100 to enter the atmosphere or move to the different orbit. As illustrated in FIG. 2, the emergency deorbit device 10 includes a propulsion module 27, a spin thruster 29, the reception unit 31, a detection unit 33, an activation device 35, a power supply device 37, a safety device 39, and a state detector 36, and a transmission unit 38.

Figure 3:
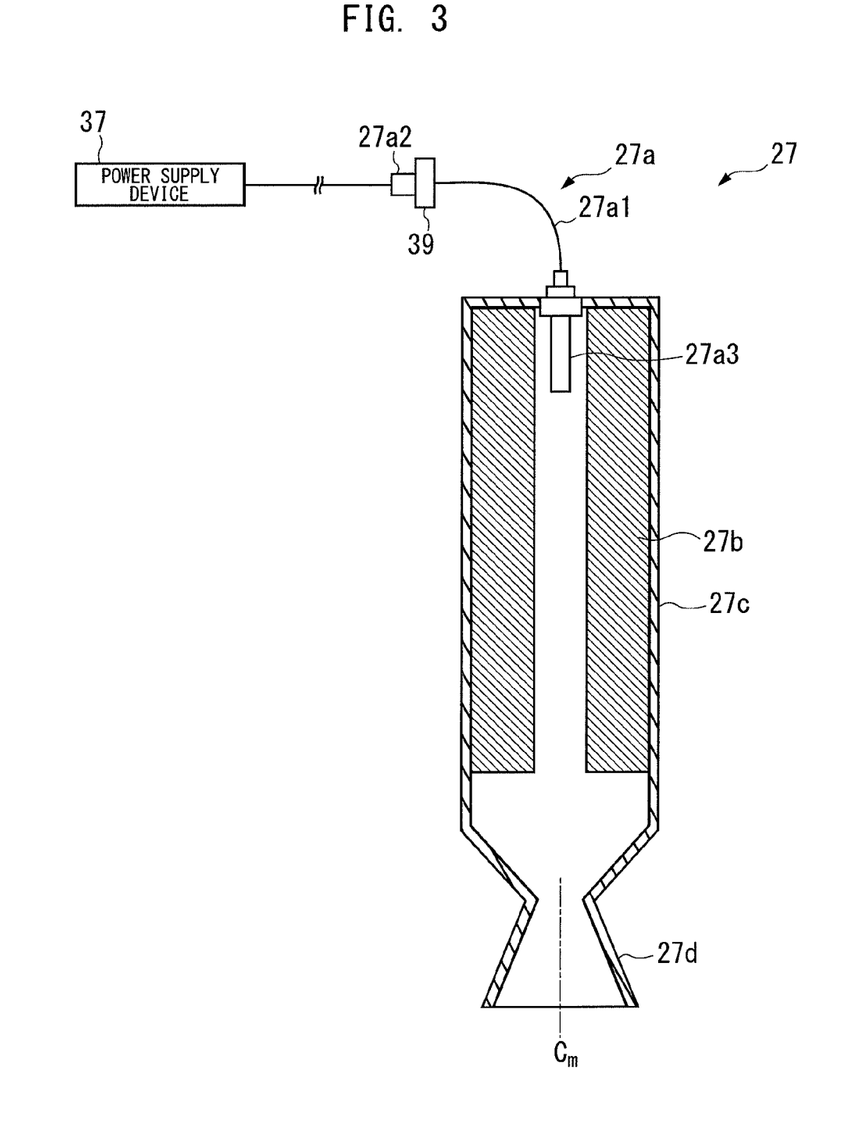
FIG. 3 illustrates a configuration example of a solid rocket motor.

The propulsion module 27 generates thrust for causing the satellite 100 to deorbit, and enter the atmosphere or move to the different orbit. In the present embodiment, the propulsion module 27 is a solid rocket motor. FIG. 3 is a schematic sectional view illustrating a configuration of the solid rocket motor 27. The solid rocket motor 27 includes an ignition device 27a, a solid fuel 27b, a motor case 27c, and a nozzle 27d. The solid fuel 27b is arranged in a combustion chamber inside the motor case 27c. When the ignition device 27a is activated by the activation device 35, the ignition device 27a ignites the solid fuel 27b. Thereby, the solid fuel 27b is burnt to generate combustion gas. When the combustion gas is ejected from the nozzle 27d to an outside, thrust is thereby applied to the satellite 100 in a direction of a thrust axis Cm.

The thrust axis Cm may be a center axis of the nozzle 27d. The thrust axis Cm may be fixed to the body of the satellite 100.

As illustrated in FIG. 1, the nozzles 27d of the two solid rocket motors 27 may be positioned so as to be symmetrical (axisymmetrical) to each other with respect to a center axis C of the satellite 100. In an example of FIG. 1, the thrust axes Cm of the two solid rocket motors 27 are parallel to the center axis C and separated from the center axis C by the same distance, and the respective thrust axes Cm and the center axis C are on the same plane.

The thrust axes Cm of the nozzles 27d of the two solid rocket motors 27 may be inclined, from a direction parallel to the center axis C, toward the same circumferential direction around the center axis C. With this configuration, one or both of the following actions (1) and (2) can be achieved.

(1) Combustion gas is ejected from each of these nozzles 27d in a direction including a component in the circumferential direction, so that thrust can be given to the satellite 100 in the direction of the center axis C, and the satellite 100 can be caused to spin around the center axis C. Thus, an attitude (the direction of the center axis C) of the satellite 100 can be stabilized.

(2) By shifting ignition time points of the two solid rocket motors 27 from each other, disturbance torque to the satellite 100 can be canceled.

The propulsion module 27 does not have to be a solid rocket motor, and may be a thruster or rocket engine using liquid fuel, for example.

The spin thruster 29 generates thrust for spinning the satellite 100. A plurality of the thrusters 29 are provided at a plurality of locations in the circumferential direction around the center axis C such that the thrusters 29 spin the satellite 100 around the center axis C of the satellite 100.

The reception unit 31 receives a repeat signal that is repeatedly sent, at the above-described sending interval, from the sending unit 21 of the satellite bus 3 in the satellite 100.

When the reception unit 31 does not receive the repeat signal in a set time period exceeding the sending interval of the repeat signal (in the case where the interval fluctuates, the set time period is a time period exceeding the maximum value of this interval or exceeding a predicted value of this maximum value), or when the reception unit 31 receives a deorbit command from the sending unit 21 or from a communication device on the ground the detection unit 33 outputs, to the activation device 35, a detection signal to that effect. Note that the sending unit 21 or a communication device on the ground may be configured so as not to transmit the above-described deorbit command to the reception unit 31.

The set time period may be a predetermined length of time, and for example, may be twice, three times, or five times the sending interval, but is not limited to these numerical examples. The detection unit 33 may include a built-in clock, and each time the reception unit 31 receives the repeat signal, the clock starts to measure elapsed time from zero. When the measured elapsed time exceeds the set time period, the detection unit 33 may output the above-described detection signal to the activation device 35. In other words, the detection unit 33 always continues to execute an operation sequence in which the detection unit 33 measures elapsed time by the clock, and when the reception unit 31 receives the repeat signal, the detection unit 33 resets the measurement of the elapsed time, and starts to measure elapsed time from zero again.

In response to the detection signal from the detection unit 33, the activation device 35 performs activation processing for activating the propulsion module 27. This activation processing is processing for activating the propulsion module 27 such that the satellite 100 is caused to be separated from the orbit on which the satellite 100 is currently flying, and enter the atmosphere or move to the above-described different orbit. The activation device 35 includes a calculation unit 35a and an activation execution unit 35b. The activation processing may be the below-described processing performed by the calculation unit 35a and the activation execution unit 35b.

The calculation unit 35a predicts a position and an attitude of the satellite 100 at each future time point, based on time information, position information, and attitude information included in respective repeat signals received by the reception unit 31. A set of the time information, the position information, and the attitude information included in one repeat signal is assumed to be one set. Based on a plurality of sets (hereinafter, simply referred to as a plurality of information sets) of the time information, the position information, and the attitude information included in a plurality of the repeat signals received a plurality of times by the reception unit 31, the calculation unit 35a predicts a position and an attitude of the satellite 100 at each future time point. Based on the predicted positions and attitudes (hereinafter, simply referred to as the predicted positions and the predicted attitudes) of the satellite 100 at these respective future time points, the calculation unit 35a specifies a future time point of activating the propulsion module 27.

Specifically, the calculation unit 35a stores a plurality of information sets, and based on a plurality of information sets, the calculation unit 35a determines an orbit of the satellite 100, and determines, for each future time point, a direction of a tangent line of the orbit at the predicted position and a thrust direction of the propulsion module 27 in the predicted attitude. Here, the direction of the tangent line is a movement direction of the satellite 100, and the thrust direction is a direction of the thrust axis Cm, i.e., a direction in which the propulsion module 27 ejects combustion gas to an outside. The direction of the tangent line and the thrust direction are represented by the same coordinate system (e.g., the coordinate system fixed to the earth). Next, the calculation unit 35a determines whether or not the determined direction of the tangent line and the determined thrust direction satisfy a predetermined condition. This predetermined condition is a condition that when the propulsion module 27 is activated at the future time point, the propulsion module 27 causes the satellite 100 to enter the atmosphere or to move to the above-described different orbit. For example, when the emergency deorbit device 10 is assumed to cause the satellite 100 to enter the atmosphere, the predetermined condition may be a condition that an angle made by the determined direction of the tangent line and the determined thrust direction is equal to or smaller than a threshold value. When the emergency deorbit device 10 is assumed to cause the satellite 100 to move to the different orbit, the predetermined condition may be set in advance in the calculation unit 35a, based on the predetermined different orbit.

The activation execution unit 35b includes a built-in clock, and activates the propulsion module 27 when time measured by the clock becomes time point specified by the calculation unit 35a.

When (e.g., immediately before, immediately after, or at the same time) the activation device 35 activates the propulsion module 27, the activation device 35 activates the thrusters 29. Thereby, the satellite 100 deorbits by thrust of the propulsion module 27 while spinning.

The power supply device 37 supplies electric power to the respective constituent elements of the emergency deorbit device 10. In the example of FIG. 2, the power supply device 37 supplies electric power to the reception unit 31, the detection unit 33, the activation device 35, and the safety device 39, thereby enabling these devices to operate. The power supply device 37 may include a secondary battery. In this case, electric power generated by the power generation panel 13 may be stored in this secondary battery, and the electric power stored in this secondary battery may be supplied to the respective constituent elements of the emergency deorbit device 10. However, the power supply device 37 may include a primary battery instead of the secondary battery. In this case, the emergency deorbit device 10 including the power supply device 37 is a device independent of the satellite bus 3.

A state of the safety device 39 is switched between a first state where the solid rocket motor 27 cannot be ignited and a second state where the solid rocket motor 27 can be ignited. In the case where the safety device 39 is in the first state, the ignition device 27a cannot ignite the solid fuel 27b by electric power even when the activation device 35 causes the power supply device 37 to supply the electric power to the ignition device 27a in order to activate the ignition device 27a. In the case where the safety device 39 is in the second state, the ignition device 27a can ignite the solid fuel 27b by electric power when the activation device 35 causes the power supply device 37 to supply the electric power to the ignition device 27a in order to activate the ignition device 27a. When activating the propulsion module 27, the activation device 35 switches a state of the safety device 39 from the first state to the second state, and causes the power supply device 37 to supply electric power to the ignition device 27a, thereby activating the ignition device 27a. Thereby, the solid fuel 27b is ignited.

In the example of FIG. 3, the ignition device 27a includes a fuse 27a1, a firing unit 27a2 that fires the fuse 27a1, and an ignition unit 27a3 that is activated by a spark transmitted through the fuse 27a1 and thereby ignites the solid fuel 27b. The safety device 39 may be a movable mechanism that is provided at the firing unit 27a2 and that is driven from a position of the first state to a position of the second state by electric power from the power supply device 37. The activation device 35 (activation execution unit 35b) causes the power supply device 37 to supply electric power to the safety device 39, thereby moving the safety device 39 from the position of the first state to the position of the second state, and then, causes the power supply device 37 to supply electric power to the firing unit 27a2, thereby activating the ignition device 27a. Thereby, combustion gas from the solid fuel 27b of the solid rocket motor 27 is ejected from the nozzle 27d, and thus, thrust is generated. When a plurality of (e.g., two as in the above-described example) solid rocket motors 27 are provided, the above-described safety device 39 may be provided for each solid rocket motor 27. FIG. 3 represents one example, and the fuse 27a1 may be omitted, and the firing unit 27a2 may directly ignite the ignition unit 27a3. In this case, the safety device 39 and the firing unit 27a2 may be integrated with each other.

The state detector 36 detects an internal state of the emergency deorbit device 10. This internal state may be any one or any combination (e.g., all) of the following items (a) to (d), for example.

(a) An operating state of the detection unit 33 (e.g., at least one of: the number of times measurement of elapsed time performed by the clock of the detection unit 33 is reset as described later; time measured by the clock of the detection unit 33 at the time of detection performed by the state detector 36; and a difference between this measured time and the above-described set time period).

(b) A state (i.e., the first state or the second state) of the safety device 39.

(c) An electric power amount (battery remaining amount) stored in the secondary battery included in the power supply device 37.

(d) A plurality of the above-described information sets stored in the calculation unit 35a.

The transmission unit 38 transmits the internal information to the satellite bus 3 (e.g., the communication device 25) in a wireless or wired manner, the internal information representing an internal state detected by the state detector 36. Thereby, the communication device 25 transmits the internal information to the communication device on the ground. The detection of the internal state performed by the state detector 36 and the transmission of the internal information performed by the transmission unit 38 is repeatedly performed at a predetermined interval (e.g., an interval of one day or one month) after the satellite 100 is launched.

<Emergency Deorbit Method>

Figure 4:
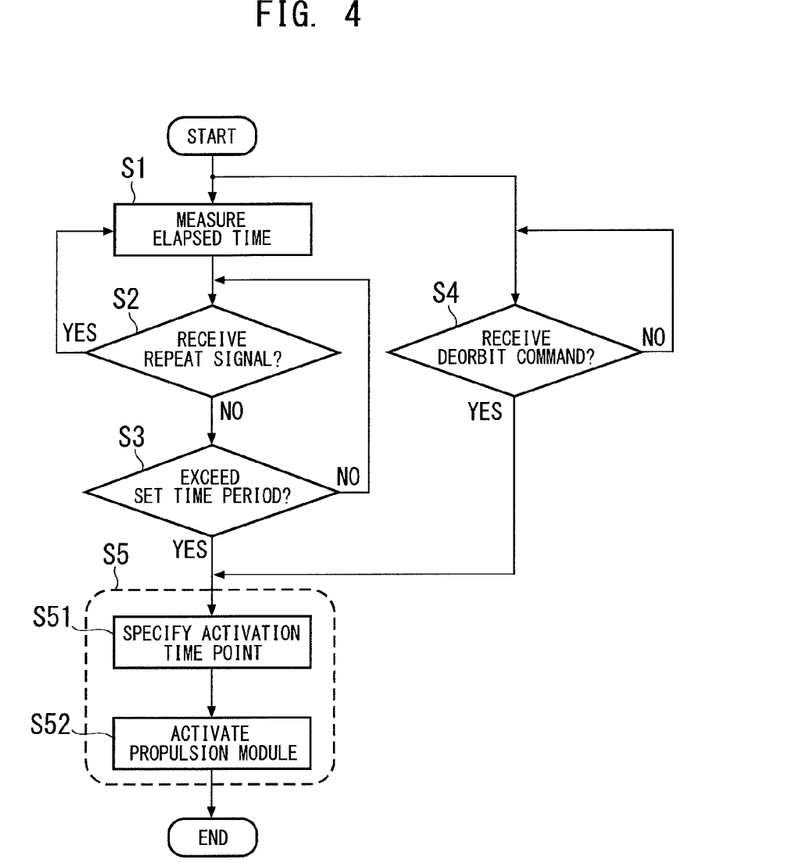
FIG. 4 is a flowchart representing an emergency deorbit method according to the first embodiment.

FIG. 4 is a flowchart representing an emergency deorbit method according to the first embodiment. This emergency deorbit method may be started when the satellite 100 is launched and placed in an orbit. The emergency deorbit method is performed using the above-described emergency deorbit device 10. The emergency deorbit method includes steps S1 to S5.

At the step S1, the detection unit 33 starts to measure elapsed time from zero by the built-in clock. The measurement of the elapsed time at the step S1 is continued until this measurement is reset. In other words, the steps S2 and S3 are performed while the measurement is performed.

At the step S2, the detection unit 33 determines whether or not the reception unit 31 has received a repeat signal. When a result of this determination is affirmative, the measurement of the elapsed time performed by the detection unit 33 is reset, and the step S1 is restarted. When a result of the determination at the step S2 is negative, the processing proceeds to the step S3.

At the step S3, the detection unit 33 determines whether or not the currently measured elapsed time exceeds the set time period. When a result of this determination is negative, the measurement of the elapsed time at the step S1 is continued, and the step S2 is performed again. Meanwhile, when a result of the determination at the step S3 is affirmative, the processing proceeds to the step S5. In the present embodiment, the operation sequence of the steps S1 to S3 is always being activated (executed) in the emergency deorbit device 10 in this manner, and the measurement of the elapsed time is reset by receiving the repeat signal.

The step S4 is repeated in parallel with the above-described steps S1 to S3. At the step S4, the detection unit 33 determines whether or not the above-described deorbit command has been received. When a result of this determination is negative, the determination at the step S4 is performed again. When a result of the determination at the step S4 is affirmative, the processing proceeds to the step S5.

At the step S5, the detection unit 33 outputs a detection signal to the activation device 35. In response to this detection signal, the activation device 35 performs activation processing for activating the propulsion module 27. The activation processing is the processing of the step S5. The step S5 includes steps S51 and S52. At the step S51, the calculation unit 35a specifies a future time point, based on the time information, the position information, and the attitude information included in a plurality of the respective repeat signals received by the reception unit 31 up to this time. This future time point is a time point of activating the propulsion module 27 as described above. At the step S52, the activation execution unit 35b activates the propulsion module 27 at the time point specified at the step S51. For example, the activation execution unit 35b switches a state of the safety device 39 from the first state to the second state, and activates the ignition device 27a. Thereby, thrust generated by the propulsion module 27 causes the satellite 100 to be separated from the orbit, and to enter the atmosphere or move to the above-described different orbit.

The respective constituent elements (the detection unit 33, the reception unit 31, and activation device 35 in this embodiment) executing the steps S1 to S5 function by electric power from the power supply device 37, whereby the above-described steps S1 to S5 are executed.

When the sending unit 21 or a communication device on the ground is configured so as not to transmit the above-described deorbit command to the reception unit 31, the step S4 is omitted in the flowchart of FIG. 4.

Advantageous Effect of First Embodiment

According to the first embodiment, in the emergency deorbit device 10, the reception unit 31 receives a repeat signal repeatedly sent at the sending interval from the satellite bus 3 of the satellite 100. When the reception unit 31 does not receive the repeat signal in the set time period exceeding the sending interval, the detection unit 33 outputs a detection signal indicating that fact. The detection signal indicates that the satellite bus 3 is not functioning. In response to this detection signal, the activation device 35 performs the activation processing for activating the propulsion module 27. At this time, even when the power supply device 15 of the satellite bus 3 is not functioning, the activation device 35 can be made to function by the power supply device 37 provided separately from the power supply device 15. Therefore, regardless of soundness of the satellite bus 3 of the satellite 100, the propulsion module 27 can positively cause the satellite 100 to be separated from the orbit, and to enter the atmosphere or move to the above-described different orbit.

When the reception unit 31 receives the above-described deorbit command, the activation device 35 activates the propulsion module 27. Thereby, the propulsion module 27 positively causes the satellite 100 to be separated from the orbit, as well.

The solid rocket motor 27 is constituted by parts whose number is smaller than that of a propulsion module using liquid fuel, and has a configuration simpler than that of the propulsion module using liquid fuel. Accordingly, a malfunction rate thereof can be suppressed to be low. Therefore, even when the satellite bus 3 malfunctions, the solid rocket motor 27 can be activated with high reliability.

The solid rocket motor 27 can complete fuel combustion in a time period shorter than that in the propulsion module using liquid fuel. Accordingly, a change amount of an attitude of the satellite 100 is small in a short time period from combustion start time to combustion end time of the solid fuel 27b of the solid rocket motor 27. Therefore, a direction in which the solid rocket motor 27 gives propulsion to the satellite 100 is unlikely to be influenced by attitude change of the satellite 100.

When (e.g., immediately before, immediately after, or at the same time of) activating the propulsion module 27, the activation device 35 activates the thrusters 29. Thereby, the satellite 100 moves by thrust generated by the propulsion module 27 while spinning, and thus, the propulsion of the satellite 100 made by the propulsion module 27 can be stabilized. In other words, influence applied to the propulsion of the propulsion module 27 by attitude change of the satellite 100 can be suppressed to be small.

Figure 5:
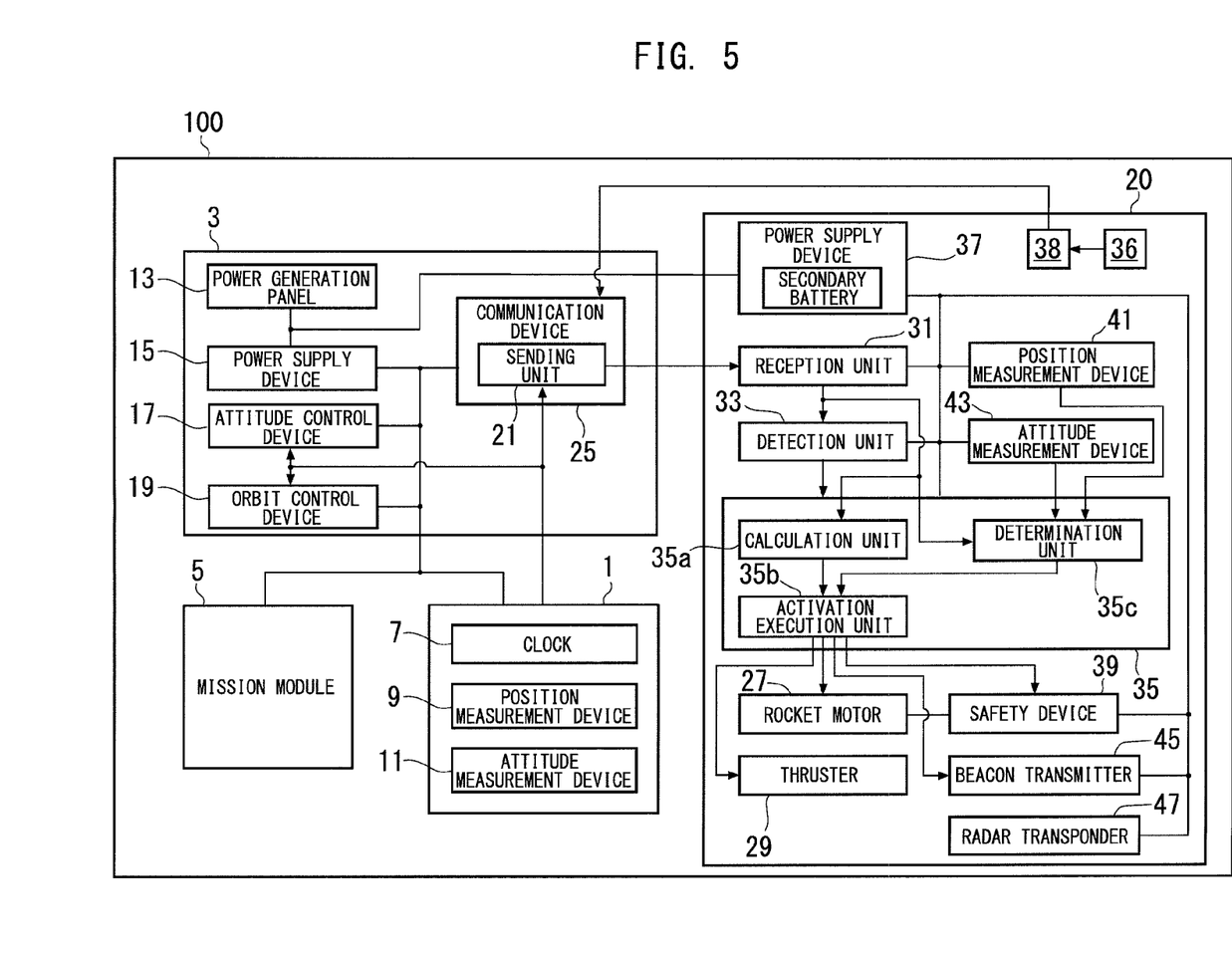
FIG. 5 is a block diagram illustrating a configuration of a satellite to which an emergency deorbit device according to a second embodiment of the present invention has been applied.

The state detector 36 detects an internal state of the emergency deorbit device 10 (in the case of the second embodiment described later, the emergency deorbit device 20), and internal information representing the internal state is transmitted via the satellite bus 3 to the communication device on the ground. Thereby, an internal state of the emergency deorbit device 10 can be monitored on the ground.

Second Embodiment

FIG. 5 is a block diagram illustrating a configuration of a satellite 100 to which an emergency deorbit device 20 according to the second embodiment of the present invention has been applied. The emergency deorbit device 20 according to the second embodiment is different from the emergency deorbit device 10 according to the first embodiment in that the below-described points. The points that are not described below concerning the emergency deorbit device 20 according to the second embodiment may be the same as those in the emergency deorbit device 10 according to the first embodiment.

<Position Measurement Device and Attitude Measurement Device>

The emergency deorbit device 20 according to the second embodiment further includes a position measurement device 41 and an attitude measurement device 43 in addition to the configuration of the emergency deorbit device 10 according to the first embodiment. The position measurement device 41 measures, every moment, a position of the emergency deorbit device 20 as a position of the satellite 100. A configuration of the position measurement device 41 may be the same as that of the above-described position measurement device 9 of the sensor system 1, or may be different from the position measurement device 9. In the latter case, the position measurement device 41 may be a device that receives radio waves from a plurality of satellites constituting a global navigation satellite system, and calculates a position of the satellite 100, based on these radio waves.

The attitude measurement device 43 measures, as an attitude of the satellite 100, an attitude (e.g., a direction of a predetermined reference line parallel to the center axis C) of the emergency deorbit device 20, every moment. A configuration of the attitude measurement device 43 may be the same as that of the above-described attitude measurement device 11 of the sensor system 1.

In the second embodiment, an internal state detected by the state detector 36 may be an internal state that is a combination of the internal state in the case of the first embodiment and the following additional item (e), or may be the following item (e) instead of the internal state in the case of the first embodiment.

(e) One or both of a measurement result of the position measurement device 41 and a measurement result of the attitude measurement device 43. The measurement result of the position measurement device 41 is positions of the satellite 100 that are repeatedly measured by the position measurement device 41 and that are stored in an appropriate storage unit. The measurement result of the attitude measurement device 43 is attitudes of the satellite 100 that are repeatedly measured by the attitude measurement device 43 and that are stored in an appropriate storage unit.

The activation device 35 further includes a determination unit 35c. In response to the above-described detection signal output from the detection unit 33, the determination unit 35c performs activation processing for activating the propulsion module 27. In other words, when the emergency deorbit device 20 is assumed to cause the satellite 100 to enter the atmosphere, the determination unit 35c determines whether or not a position measured every moment by the position measurement device 41 and an attitude measured every moment by the attitude measurement device 43 become a position and an attitude that enable the propulsion module 27 to cause the satellite 100 to enter the atmosphere. The determination unit 35c makes this determination every moment. When the emergency deorbit device 20 is assumed to cause the satellite 100 to move to the above-described different orbit, the determination unit 35c determines whether or not a position measured every moment by the position measurement device 41 and an attitude measured every moment by the attitude measurement device 43 become a position and an attitude that enable the propulsion module 27 to cause the satellite 100 to move to the above-described different orbit. The determination unit 35c makes this determination every moment. When a result of the determination made by the determination unit 35c becomes affirmative, the activation execution unit 35b activates the propulsion module 27.

Specifically, for each time point (hereinafter, referred to as a target time point), based on a position and an attitude of the satellite 100 measured at the target time point by the position measurement device 41 and the attitude measurement device 43, the determination unit 35c determines a tangent line that is on the orbit of the satellite 100 and that is at this measured position, determines the thrust axis Cm of the propulsion module 27 in this measured attitude of the satellite 100, and determines whether or not the determined tangent line and the determined thrust axis Cm satisfy the predetermined condition described in the first embodiment.

Here, the orbit of the satellite 100 may be determined by the determination unit 35c, based on the time information and the position information included in the repeat signals received by the reception unit 31 a plurality of times up to the target time point. Alternatively, the orbit of the satellite 100 may be determined by the determination unit 35c, based on positions of the satellite 100 measured by the position measurement device 41 at a plurality of time points including the target time point and time points before the target time point. In the latter case, the position measurement device 41 may include a built-in clock, and the determination unit 35c may determine the orbit of the satellite 100, based on positions of the satellite 100 measured by the position measurement device 41 at a plurality of time points including the target time point and time points before the target time point, and time measured by the clock at a plurality of these time points.

In the second embodiment, the calculation unit 35a may be omitted, or both the calculation unit 35a and the determination unit 35c may be provided. In the latter case, in one example, when a result of the above-described determination made by the determination unit 35c does not become affirmative at the time point specified by the calculation unit 35a, the activation execution unit 35b does not activate the propulsion module 27.

<Beacon Transmitter>

The emergency deorbit device 20 according to the second embodiment further includes a beacon transmitter 45. The beacon transmitter 45 wirelessly transmits a beacon signal (radio wave) every moment. The beacon signal includes position information representing a position of the satellite 100 measured every moment by the position measurement device 41. The beacon signal further includes identification information of the satellite 100.

The activation execution unit 35b of the activation device 35 activates the beacon transmitter 45 when activating the propulsion module 27. Thereby, from the time that the propulsion module 27 is activated, the beacon transmitter 45 transmits a beacon signal every moment. The beacon signal includes the latest position of the satellite 100 measured by the position measurement device 41. The beacon signal further includes the identification information of the satellite 100. Accordingly, the beacon signal is received by the communication device on the ground, and thereby, the ground side can grasp a position where the satellite 100 enters the atmosphere or a position of the satellite 100 on the above-described different orbit. The above-described beacon signal may further include information indicating that the satellite 100 will enter the atmosphere, or information indicating that the satellite 100 will move to the above-described different orbit.

<Radar Transponder>

The emergency deorbit device 20 according to the second embodiment further includes a radar transponder 47. The radar transponder 47 receives a radar radio wave transmitted from a search radar outside the satellite 100, and transmits a response radio wave as a reply to the received radar radio wave. The search radar may be mounted on an aircraft, a ship, or the like.

Specifically, the search radar emits a radar radio wave at a predetermined emission cycle. This emission cycle is one millisecond, for example. The search radar receives a response radio wave from the radar transponder 47. Thereby, the search radar can recognize an existence position of the radar transponder 47.

In the second embodiment, the position measurement device 41, the attitude measurement device 43, the beacon transmitter 45, and the radar transponder 47 are configured so as to operate by electric power supplied from the power supply device 37.

<Emergency Deorbit Method>

Figure 6:
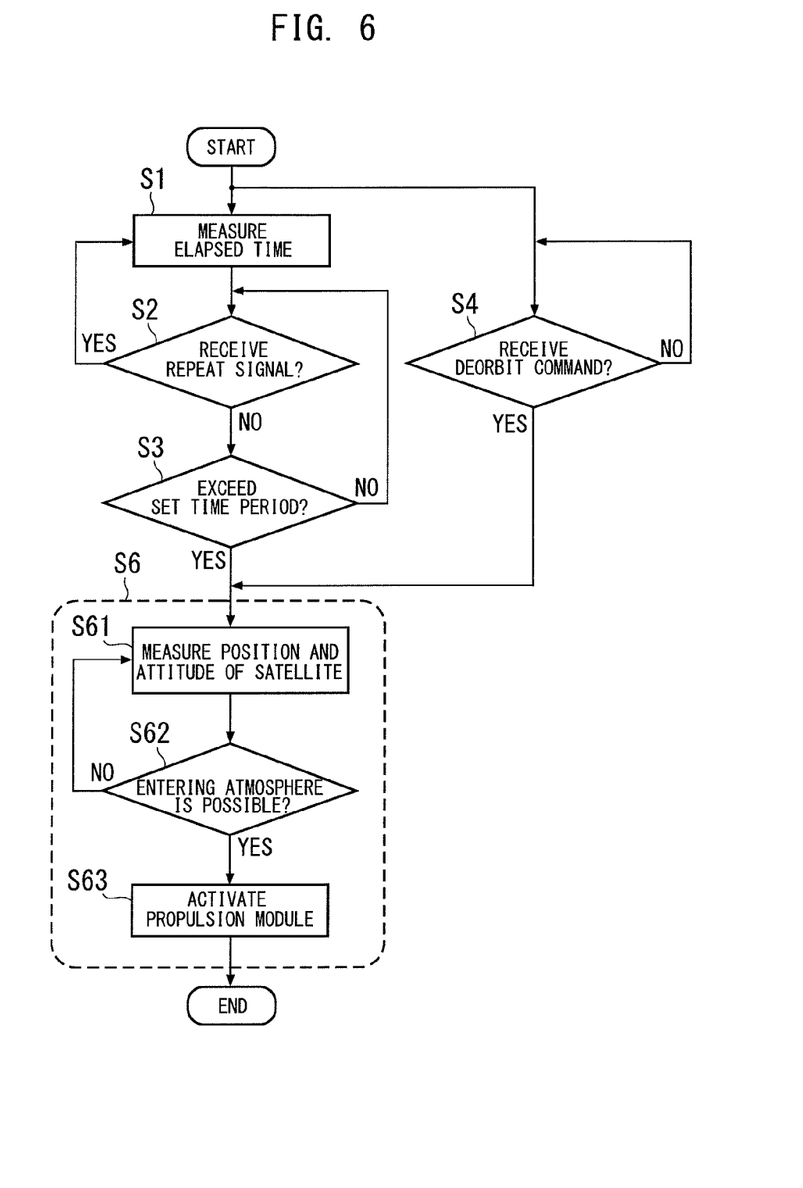
FIG. 6 is a flowchart representing an emergency deorbit method according to the second embodiment of the present invention.

FIG. 6 is a flowchart representing an emergency deorbit method according to the second embodiment. This emergency deorbit method is performed using the emergency deorbit device 20 according to the second embodiment. In the emergency deorbit method according to the second embodiment, a step S6 is performed instead of the step S5 in the first embodiment. The steps S1 to S4 in the emergency deorbit method according to the second embodiment are the same as those in the first embodiment.

In the second embodiment, when a result of the determination at the step S3 becomes affirmative, or when a result of the determination at the step S4 becomes affirmative, the step S6 is performed.

At the step S6, the detection unit 33 outputs a detection signal, and in response to this detection signal, the activation device 35 performs activation processing for activating the propulsion module 27. The activation processing is processing of the step S6. At the step S61, the position measurement device 41 measures a position of the satellite 100, and the attitude measurement device 43 measures an attitude of the satellite 100. At a step S62, the determination unit 35c determines whether or not the position and attitude of the satellite 100 measured at the step S61 are a position and an attitude that enable the satellite 100 to enter the atmosphere or to move to the above-described different orbit. When a result of the determination at the step S62 is negative, the processing returns to the step S61. When a result of the determination at the step S62 is affirmative, the processing proceeds to the step S63. At the step S63, the activation execution unit 35b activates the propulsion module 27. For example, the activation execution unit 35b switches a state of the safety device 39 from the first state to the second state, and activates the ignition device 27a.

The activation device 35 (the activation execution unit 35b) activates the beacon transmitter 45 when performing the step S63. Thereby, the beacon transmitter 45 starts to transmit the beacon signal every moment.

Advantageous Effect of Second Embodiment

In the above-described second embodiment, the same advantageous effect as that of the first embodiment can be achieved. Further, when it is determined that a position and an attitude of the satellite 100 measured by the position measurement device 41 and the attitude measurement device 43 are a position and an attitude enabling the satellite 100 to enter the atmosphere or to move to the above-described orbit, the propulsion module 27 is activated. Thus, the satellite 100 can be caused to enter the atmosphere or to move to the different orbit, with high reliability.

In addition, the beacon signal from the beacon transmitter 45 can notify a base station on the ground side of a position of the satellite 100 entering the atmosphere. When the satellite 100 is moved to the different orbit, the beacon signal can notify a base station on the ground side of a position of the satellite 100 that is moving to the different orbit, or the beacon signal can notify a base station of a position of the satellite 100 on the different orbit. Further, providing the radar transponder 47 enables a position of the satellite 100 to be detected by the search radar.

The present invention is not limited to the above-described embodiments, and as a matter of course, various modifications can be made within the scope of the technical idea of the present invention. For example, the advantageous effect of the present invention may be achieved by a configuration made by omitting a part of the constituent elements in the above-described first or second embodiment.

In one example, the thrusters 29 may be omitted in the first embodiment. In another example, a part or all of the position measurement device 41, the attitude measurement device 43, the beacon transmitter 45, and the radar transponder 47 may be omitted in the second embodiment. A part of the configuration of the first embodiment may be combined with or replaced with a part of the configuration of the second embodiment. For example, one or both of the beacon transmitter 45 and the radar transponder 47 may be adopted in the first embodiment. In the first embodiment, the determination unit 35c may be provided instead of the calculation unit 35a.

Figure 7:
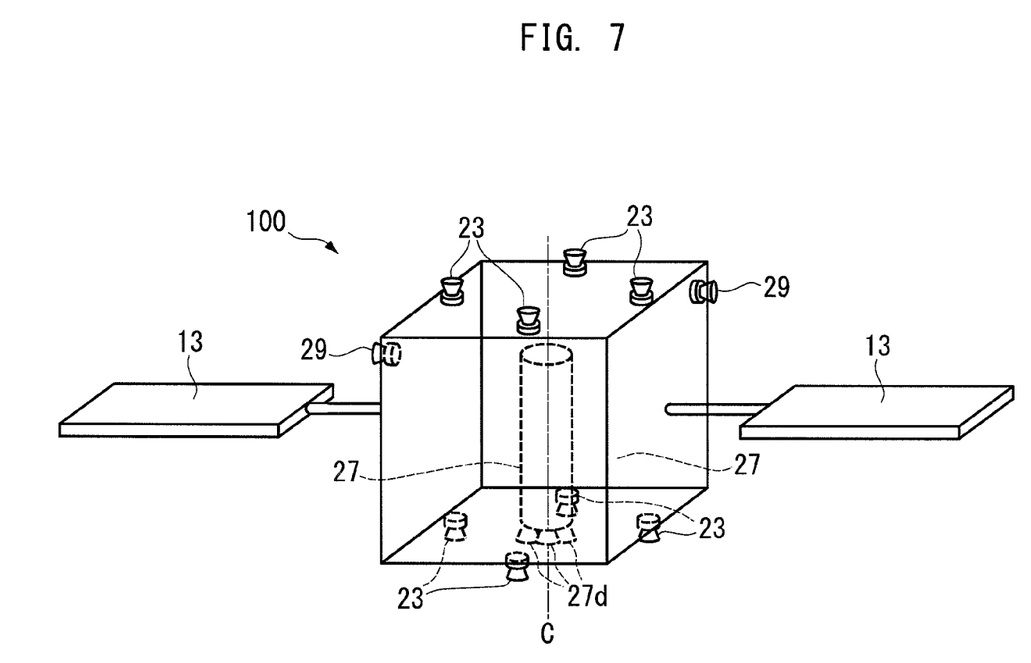
FIG. 7 illustrates another form of a rocket motor.

Further, one solid rocket motor 27 may be arranged on the center axis C of the satellite 100. In this case, as illustrated in FIG. 7, the solid rocket motor 27 may have a plurality of nozzles 27d for one motor case 27c. As a result, an entire length of the nozzles 27d can be shortened without changing performance of the solid rocket motor 27.

Furthermore, a plurality of these nozzles 27d may be arranged at a plurality of respective positions (e.g., at an equal interval) in a circumferential direction around the center axis C. In this case, a plurality of the nozzles 27*d* may be inclined, from a direction parallel to the center axis C, toward the same circumferential direction around the center axis C. With this configuration, combustion gas is ejected from a plurality of the nozzles 27*d* in the direction including a component of the circumferential direction. Thereby, it is possible to cause the satellite 100 to spin around the center axis C while giving thrust to the satellite 100 in the direction of the center axis C direction.

REFERENCE SIGNS LIST

1 Sensor system
3 Satellite bus
5 Mission module
7 Clock
9 Position measurement device
11 Attitude measurement device
13 Power generation panel
15 Power supply device
17 Attitude control device
19 Orbit control device
21 Sending unit
23 Attitude-and-orbit control thruster
25 Communication device
27 Propulsion module (solid rocket motor)
27*a* Ignition device
27*a*1 Fuse
27*a*2 Firing unit
27*a*3 Ignition unit
27*b* Solid fuel
27*c* Motor case
27*d* Nozzle
29 Spin thruster
31 Reception unit
33 Detection unit
35 Activation device
35*a* Calculation unit
35*b* Activation execution unit
35*c* Determination unit
36 State detector
37 Power supply device
38 Transmission unit
39 Safety device
41 Position measurement device
43 Attitude measurement device
45 Beacon transmitter
47 Radar transponder
10, 20 Emergency deorbit device
100 Satellite

The invention claimed is:

1. An emergency deorbit device to be provided in a satellite flying on an orbit around the earth, for the purpose of separating the satellite from the orbit, the emergency deorbit device comprising:
 a solid rocket motor that generates thrust for separating the satellite from the orbit, wherein the solid rocket motor is configured to complete fuel combustion in a relatively short time such that a direction in which the solid rocket motor gives propulsion to the satellite avoids influence by attitude change of the satellite;
 a reception unit that receives a repeat signal repeatedly sent at an interval from a sending unit of a satellite bus in the satellite;
 a detection unit configured to:
  measure elapsed time from a time that the reception unit receives each repeat signal,
  reset measurement of elapsed time upon the reception unit receiving each respective subsequent repeat signal, and
  output a detection signal to an activation device when a measured elapsed time exceeds a set time period;
 a position measurement device that measures a position of the satellite;
 an attitude measurement device that measures an attitude of the satellite;
 the activation device configured such that, in response to the detection signal, without requiring control of an attitude of the satellite, regardless of whether the satellite bus malfunctions or not, the activation device determines an orbit of the satellite and activates the solid rocket motor, based on the position and the attitude of the satellite measured by the position measurement device and the attitude measurement device, such that the activation device activates the solid rocket motor after waiting for a time point at which a condition that the solid rocket motor can cause the satellite to enter the atmosphere or to move to a different orbit is satisfied; and
 a power supply device that is provided separately from a power supply device of the satellite bus and that supplies electric power to the reception unit, the detection unit, and the activation device.

2. The emergency deorbit device according to claim 1, wherein the repeat signal includes time information and position information, the time information representing time measured in the satellite, the position information representing a position of the satellite on the orbit, the position being measured at the measured time,
 wherein in response to the detection signal, without requiring control of an attitude of the satellite, regardless of whether the satellite bus malfunctions or not, the activation device determines the orbit of the satellite, based on the time information and the position information included in the repeat signals, and activates the solid rocket motor, after waiting for a time point at which the condition that the solid rocket motor can cause the satellite to enter the atmosphere or to move to a different orbit is satisfied.

3. The emergency deorbit device according to claim 1, wherein the power supply device of the emergency deorbit device includes a primary battery.

4. The emergency deorbit device according to claim 1, wherein the power supply device of the emergency deorbit device includes a battery,
 the satellite bus includes a power generation panel that generates electric power by sunlight, and
 the battery is charged by the electric power generated by the power generation panel.

5. The emergency deorbit device according to claim 2, wherein the solid rocket motor includes two solid rocket motors each including solid fuel and a nozzle that ejects, to an outside of the satellite, combustion gas generated from the solid fuel, and
 center axes of the two solid rocket motors are positioned so as to be symmetrical to each other with respect to the center axis of the satellite.

6. The emergency deorbit device according to claim 1, comprising a thruster that generates thrust for spinning the satellite,
 wherein the activation device activates the thruster when activating the solid rocket motor.

7. The emergency deorbit device according to claim 1, comprising:

a state detector that detects an internal state of the emergency deorbit device; and a transmission unit that transmits, to the satellite bus, internal information representing the internal state detected by the state detector.

8. The emergency deorbit device according to claim 1, comprising:

a beacon transmitter that wirelessly transmits a beacon signal including position information representing a position measured by the position measurement device, the beacon signal further including identification information of the satellite, wherein the activation device activates the beacon transmitter when activating the solid rocket motor.

9. The emergency deorbit device according to claim 1, comprising a radar transponder that receives a radar radio wave transmitted from a search radar outside the satellite, and transmits a response radio wave as a reply to the received radar radio wave.

10. The emergency deorbit device according to claim 1, wherein the detection unit continues to execute an operation sequence of measuring elapsed time, and when the reception unit receives the repeat signal, resetting measurement of elapsed time and starting to measure elapsed time from zero again, when the elapsed time exceeds the set time period, the detection unit outputs the detection signal.

11. An emergency deorbit method for a satellite flying on an orbit around the earth, wherein a solid rocket motor for generating thrust for separating the satellite from the orbit is provided in the satellite, and the solid rocket motor is configured to complete fuel combustion in a relatively short time such that a direction in which the solid rocket motor gives propulsion to the satellite avoids influence by attitude change of the satellite, wherein the method is performed by an emergency deorbit device provided in the satellite for the purpose of separating the satellite from the orbit, and the method comprises:

a step (A) of receiving, by a reception unit provided in the satellite, a repeat signal repeatedly sent at an interval from a sending unit of a satellite bus in the satellite;

a step (B) of measuring elapsed time from time that the reception unit receives each repeat signal, resetting measurement of elapsed time each time the reception unit receives each respective subsequent repeat signal, and outputting a detection signal when a measured elapsed time exceeds a set time period; and a step (C) of, in response to the detection signal, without requiring control of an attitude of the satellite, regardless of whether the satellite bus malfunctions or not, determining an orbit of the satellite and activating the solid rocket motor, based on a position and an attitude of the satellite measured by a position measurement device and an attitude measurement device of the emergency deorbit device, wherein the activating of the solid rocket motor is performed after waiting for a time point at which a condition that the solid rocket motor can cause the satellite to enter the atmosphere or to move to a different orbit is satisfied, wherein the steps (A) to (C) are performed by electric power from a power supply device provided in the satellite separately from a power supply device of the satellite bus.

* * * * *